(12) United States Patent
Ramprasad

(10) Patent No.: US 10,492,076 B2
(45) Date of Patent: *Nov. 26, 2019

(54) SYSTEM AND METHOD OF SECURELY SUPPORTING ONE OR MORE VIRTUAL APPLICATION SOURCES ON A WIRELESS DEVICE

(71) Applicant: TracFone Wireless, Inc., Miami, FL (US)

(72) Inventor: Satish Ramprasad, Miami, FL (US)

(73) Assignee: TRACFONE WIRELESS, INC., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/267,908

(22) Filed: Feb. 5, 2019

(65) Prior Publication Data

US 2019/0174317 A1 Jun. 6, 2019

Related U.S. Application Data

(63) Continuation of application No. 15/215,990, filed on Jul. 21, 2016, now Pat. No. 10,200,867.

(60) Provisional application No. 62/194,999, filed on Jul. 21, 2015.

(51) Int. Cl.
| | | |
|---|---|---|
| H04W 12/08 | (2009.01) | |
| G06F 8/61 | (2018.01) | |
| H04L 9/14 | (2006.01) | |
| H04L 9/08 | (2006.01) | |
| H04L 29/06 | (2006.01) | |
| G06F 21/60 | (2013.01) | |
| G06F 21/62 | (2013.01) | |
| H04L 29/08 | (2006.01) | |
| H04W 12/00 | (2009.01) | |
| H04W 12/04 | (2009.01) | |
| H04W 88/02 | (2009.01) | |

(52) U.S. Cl.
CPC .............. *H04W 12/08* (2013.01); *G06F 8/61* (2013.01); *G06F 21/602* (2013.01); *G06F 21/629* (2013.01); *H04L 9/0894* (2013.01); *H04L 9/14* (2013.01); *H04L 63/0823* (2013.01); *H04L 67/18* (2013.01); *H04L 67/38* (2013.01); *H04W 12/0023* (2019.01); *G06F 2221/2101* (2013.01); *G06F 2221/2141* (2013.01); *H04L 2209/80* (2013.01); *H04W 12/04* (2013.01); *H04W 88/02* (2013.01)

(58) Field of Classification Search
CPC . G06F 8/61; H04L 67/34; H04L 67/42; H04L 9/0894; H04L 9/14; H04W 12/04; H04W 12/08
See application file for complete search history.

*Primary Examiner* — Brian F Shaw
(74) *Attorney, Agent, or Firm* — BakerHostetler

(57) ABSTRACT

A method of securely supporting at least one application for use on a wireless device, including storing a plurality of locations, storing a plurality of public asymmetric keys for encryption of the plurality of locations, providing an interface for a virtual store, providing the location of a plurality of authorization files, displaying a list of applications available for the wireless device, presenting content associated with the list of applications available for the wireless device, receiving a customer selection of an application, creating an authorization file comprising the location of the application, storing the plurality of authorization files, providing an authorization file, authorizing one of the plurality of locations based on decryption of at least one of the plurality of public asymmetric keys, and installing on the wireless device the user selected application.

20 Claims, 6 Drawing Sheets

SYSTEM AND METHOD OF SECURELY SUPPORTING ONE OR MORE VIRTUAL APPLICATION SOURCES ON A WIRELESS DEVICE

CROSS REFERENCE TO PRIOR APPLICATIONS

This application is a continuation of the U.S. patent application Ser. No. 15/215,990, filed Jul. 21, 2016 now U.S. Pat. No. 10,200,867 issued Feb. 5, 2019, which is incorporated herein by reference in its entirety. This application claims the benefit from U.S. Provisional Application No. 62/194,999 filed on Jul. 21, 2015, which is hereby incorporated by reference for all purposes as if fully set forth herein.

BACKGROUND OF THE DISCLOSURE

1. Field of the Disclosure

The disclosure relates to a system and method for securely supporting one or more virtual application sources on a wireless device.

2. Related Art

A large number of application sources exist. Moreover, many wireless providers release and utilize brand agnostic devices. Also, many wireless providers have a need to support one or more game and application aggregators, based on their business needs. However, wireless providers are not always able to support the aggregators to the extent desired. For example in an Android device, Google enforces any application that is downloaded outside of the Google PLAY store to have an "Unknown Sources" exception. Other issues exist with respect to securely supporting one or more virtual game and application vendor on a wireless device.

Accordingly, a need exists to provide a mechanism for securely supporting one or more virtual game and application vendors on a wireless device.

SUMMARY OF THE DISCLOSURE

The foregoing needs are met, to a great extent, by the disclosure, providing a system and associated methods for securely supporting one or more virtual game and application vendors on a wireless device.

The solution below addresses that need in a way that is conducive to an authorized access that is beneficial to a user. Convenience, timeliness, and reliability of the wireless providers' systems are key factors that play into a user's experience. By developing a system to improve at least these factors, a more positive experience can be provided to the user. The improved experience will help retain customer base and increase the amount of customers willing to purchase wireless services from Mobile Network Operators and Mobile Virtual Network Operators. In order to do so, the following needs can be addressed by enabling new improved systems that can be implemented for the support of one or more game and application vendors.

In one aspect, a system for securely supporting a plurality applications for use on a wireless device includes at least one server having at least one processor, the at least one server configured to: receive a plurality of locations, each of the locations corresponding to a location of one of the applications, store the plurality of locations, store a plurality of public asymmetric keys, each of the public asymmetric keys corresponding to one of the plurality of locations, receive an authorization file corresponding to one of the applications, store a plurality of authorization files, each one of the plurality of authorization files comprising one of the plurality of locations of one of the applications, authorize one of the locations of one of the applications, create, with a private asymmetric key corresponding to one of the plurality of public asymmetric keys, the one of the plurality of authorization files comprising an application location, encrypt the plurality of authorization files, each one of the plurality of authorization files comprising one of the plurality of public asymmetric keys, store a list of the applications for use on the wireless device, display a menu of available content corresponding to the applications for use on the wireless device, receive a user selection of one of the applications for use on the wireless device, and install one of the applications on the wireless device.

In another aspect, a method of securely supporting applications for use on a wireless device includes storing a plurality of locations, each of the locations corresponding to a location of one of the applications for use on the wireless device, storing a plurality of public asymmetric keys for encryption of the plurality of locations, each of the public asymmetric keys corresponding to one of the plurality of locations, providing an interface for a virtual store, providing, along with the interface, the location of a plurality of authorization files, the plurality of authorization files comprising one of the plurality of locations of one of the applications for use on the wireless device, displaying, on the virtual store, a list of the applications available for the wireless device, presenting, on the virtual store, content associated with the list of applications available for the wireless device, receiving, at the virtual store, a customer selection of one of the applications, creating, with the at least one server, in response to receiving a customer selection of one of the applications, an authorization file comprising the location of one of the applications, storing, on the at least one server, the plurality of authorization files, providing an authorization file, authorizing one of the plurality of locations based on decryption of at least one of the plurality of public asymmetric keys, and installing on the wireless device, upon authorizing, the user selected one of the applications, where the steps of authorizing, creating, and installing are performed by one or more processors.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspects of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
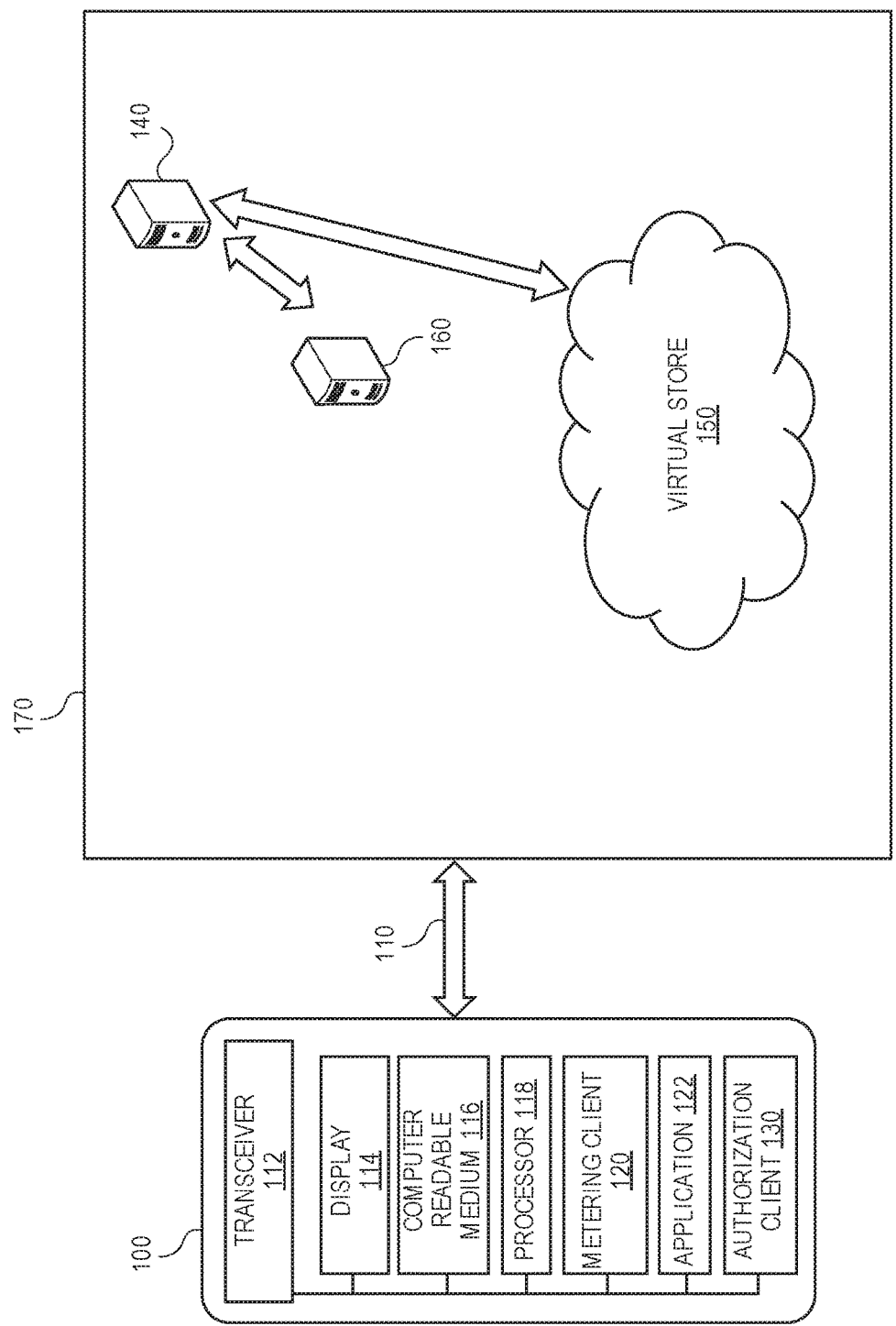
FIG. 1 illustrates components of an exemplary wireless device within a system for providing a mechanism and method for securely supporting one or more virtual game and application vendors on the wireless device, in accordance with aspects of the present disclosure.

In this specification and claims it is to be understood that reference to a wireless device is intended to encompass electronic devices such as mobile phones, tablet computers, gaming systems, MP3 players, personal computers, PDAs, Internet enabled device, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide wireless services through the use of a wireless device, such as the Global System for Mobile Communication (GSM) network, Code-Division Multiple Access (CDMA) network, Long-Term Evolution (LTE) network that may utilize the teachings of the present application to sell, activate, monitor, redeem, and/or track, the activation of one or more wireless applications and games.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data and number of minutes/text messages used.

A large number of wireless service plans exist for customers desiring wireless services such as data, talk, text messaging, and various applications and games. The wireless providers of those services need to support multiple game and application aggregators in order to meet wireless device user demands by providing access to applications and games for selection or purchase from various vendors. When a wireless device user selects an application or game from a vendor that is outside of the virtual store associated with the device and which provides the list of available applications and games, the wireless device must provide an exception that notifies the user of the unknown source if the vendor is not associated with any other game or application on the wireless device at the time of the device's manufacture.

Referring now to FIG. 1, components of an exemplary wireless device 100 within a system for providing a mechanism and method for securely supporting one or more virtual game and application vendors on the wireless device 100 are shown. Applications 122 can be supported on the wireless device 100 or distributed by the wireless provider, the manufacturer, or a third party. Applications 122 can include games, organizational functions, tools, enhancements, networking and social media interfaces, multimedia, or the like. Applications 122 can include those which can be used or played on board the wireless device 100 alone and those which require a connection to another source. Available applications 122 for addition to the wireless device 100 may or may not require a purchase price. Some applications 122 may come pre-installed on the wireless device 100, and some applications 122 may be downloaded from another source.

The wireless device 100 may have a transceiver 112, a display 114, a computer readable medium 116, a processor 118, and a metering client 120. The processor 118 may be a central processing unit configured to execute instructions such as instructions related to software programs and applications 122. Any processor can be used for the wireless device 100 as understood to those of ordinary skill in the art. The display 114 may be a liquid crystal display (LCD). Preferably the LCD includes a backlight to illuminate the various color liquid crystals to provide a more colorful display. The display 114 may also be a touchscreen. In an exemplary aspect, the touchscreen display 114 of the disclosure may detect a presence and location of a touch of a user within the display area. For example, touching the display 114 of the wireless device 100 with a finger or hand.

In one aspect, the transceiver 112 may be configured to transfer and receive data between the wireless device 100 and another device, network, server, and the like. The transceiver 112 can include, for example, a wireless antenna and associated circuitry capable of data transmission with the mobile data network utilizing at least one data transmission protocol, such as, for example, 3G, 4G Long Term Evolution (LTE), 5G (fifth generation), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The transceiver 112 may transmit and receive data over the data transmission protocol.

In one operation, the display 114 may show various objects associated with an application 122 for execution by the processor 118. For example, a user may touch the display 114 to interact with objects on the display 114. That is, touching an object may execute an application in the processor 118 associated with the object that is stored in the computer readable medium 116. Additionally or alternatively, touching an object may open a menu of options to be selected by the user. The display 114 may include a plurality of objects for the user to interact with. Moreover the display 114 may include a plurality of screens, the display 114 showing one screen at a time. The user may interact with the display 114 to move a screen into view on the display 114. Various objects may be located in each of the screens. The touchscreen display 114 may be implemented as a resistive touchscreen, a surface acoustic wave touch screen, a capacitive touchscreen, self-capacitance sensors, infrared sensors, dispersive signal technology, acoustic pulse recognition, or the like.

The display 114 is generally configured to display a graphical user interface (GUI) that provides an easy to use visual interface between a user of the wireless device 100 and the operating system or application(s) running on the wireless device 100. Generally, the GUI presents programs, files and operational options with graphical images. During operation, the user may select and activate various graphical images displayed on the display 114 in order to initiate functions and tasks associated therewith.

The computer readable medium 116 of the wireless device 100 may include an operating system, a communication component, a contact/motion component, a graphics component, and the like. The operating system together with the various components provides software functionality for each of the components of the wireless device 100. The computer readable medium 116 may include a high-speed, random-access memory. Also, the computer readable medium 116 may be a non-volatile memory, such as magnetic fixed disk storage, SIM, UICC, cloud-based memory, flash memory or the like.

In another aspect of the disclosure, the computer readable medium 116 of a wireless device 100 can include a database for storing user information. The user information may include information such as full name, address, email address, contact number, credit card information, and the like. In one aspect, the database may include security questions. In another aspect, the database may include user specified preferences. The computer readable medium may also store applications 122 pre-installed on the wireless device 100 at the time of manufacture or those which may be downloaded after the wireless device 100 has been purchased.

The computer readable medium 116 may be configured to store computer data, which can include computer program code that is executable by the processor 118 of the wireless device 100, in machine readable form. By way of example, and not limitation, the computer readable medium 116 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 116 or machine readable medium, which may be incorporated into a computer program product. The computer readable medium 116 may also be configured to store the values for the amount of wireless data service available, the amount of wireless data service used, how many days of wireless service have been used, how many days of wireless service remaining, and the like in conjunction with a metering client 120. The computer readable medium 116 may also store how much data was used for each domain, web address, wireless device application, or other web resource during a given time period, such as, for example, one billing cycle.

In yet another aspect of the disclosure, the computer readable medium 116 may include an application acquisition and activation function. The application acquisition and activation function may be an application 122 on the wireless device 100 which connects the wireless device 100 via a communication channel 110 to a virtual store 150 to shop for available applications 401 to add to the wireless device 100. The virtual store 150 can be its own server or part of a larger server 170. When a user selects an available application 401 to add to the wireless device 100, the application acquisition and activation function may coordinate with an authorization client 130 to install the selected application 401 on the wireless device 100 and to work with the metering client 120 to make any applicable purchase. The authorization client 130 may be on the wireless device 100, may be its own server, or part of a larger server 170.

In one aspect, the processor 118 can be, for example, dedicated hardware as defined herein, a computing device as defined herein, a computer processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the metering client.

The system for providing applications 401 available to the wireless device 100 may include at least one larger server 170. The at least one larger server 170 may perform all of the functions described herein as functions of an authorization client 130, an authorization server 140, a virtual store 150, and an update server 160. In such an aspect, the authorization client 130, authorization server 140, virtual store 150, and update server 160 may all be found on the at least one larger server 170. The at least one larger server 170 may include all of the components described herein as parts of the authorization client 130, authorization server 140, virtual store 150, and update server 160. In another aspect, the authorization client 130, authorization server 140, virtual store 150, and update server 160 may be separate servers.

The system for providing available applications may include an authorization client 130 configured to authorize the virtual location (element 201 of FIG. 2) of applications (element 401 of FIG. 4) available for addition to the wireless device 100. The authorization client 130 may also be configured to install applications 201 on the wireless device 100 based on user selection and consent, as discussed further below. In addition, the authorization client 130 may be configured to provide an interface (element 250 of FIG. 2) to a virtual store 150 in order to provide the location 401 of authorization files (element 301 of FIG. 3) created by an authorization server 140.

Another aspect of the system may be the authorization server 140. The authorization server 140 may be configured to create an authorization file (element 301 of FIG. 3) for each available application 401. The authorization server 140 may also be configured to provide an authorization file 301 corresponding to an application 401 in the virtual store 150.

In still another aspect of the disclosure, the virtual store 150 may be configured to provide a list of applications 401 available to users on a wireless device 100. The virtual store 150 may display on the wireless device 100 the available games and applications 401 for the wireless device 100. This display may be in the form of a list, a presentation of application or game icons, content previews, images, or the like. The virtual store 150 may be configured to work with the authorization server 140 to create an authorization file 301 for any selected application 401.

In another aspect of the disclosure, the system may include an update server 160. The update server 160 may be configured to provide updates to both the authorization client 130 and the authorization server 140. The update server 160 may be its own server or part of the at least one larger server 170. The update server 160 may update the authorization client 130 and authorization server 140, as explained below, when asymmetric key pairs (element 402 of FIG. 4) are updated or added to the system.

Figure 2:
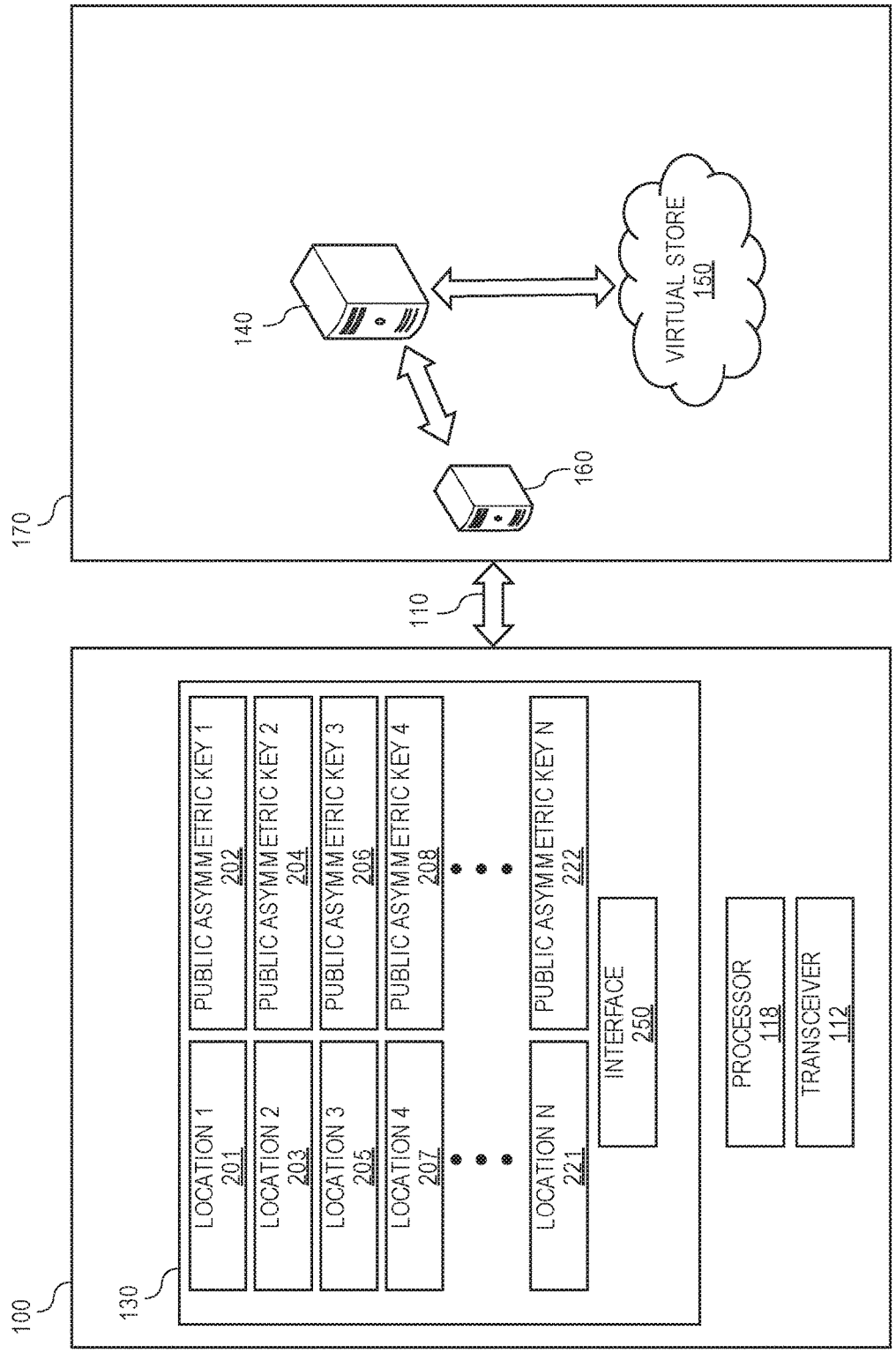
FIG. 2 illustrates the components of an exemplary authorization client used in a system for providing a mechanism and method for securely supporting one or more virtual game and application vendors on the wireless device, in accordance with aspects of the present disclosure.
Figure 3:
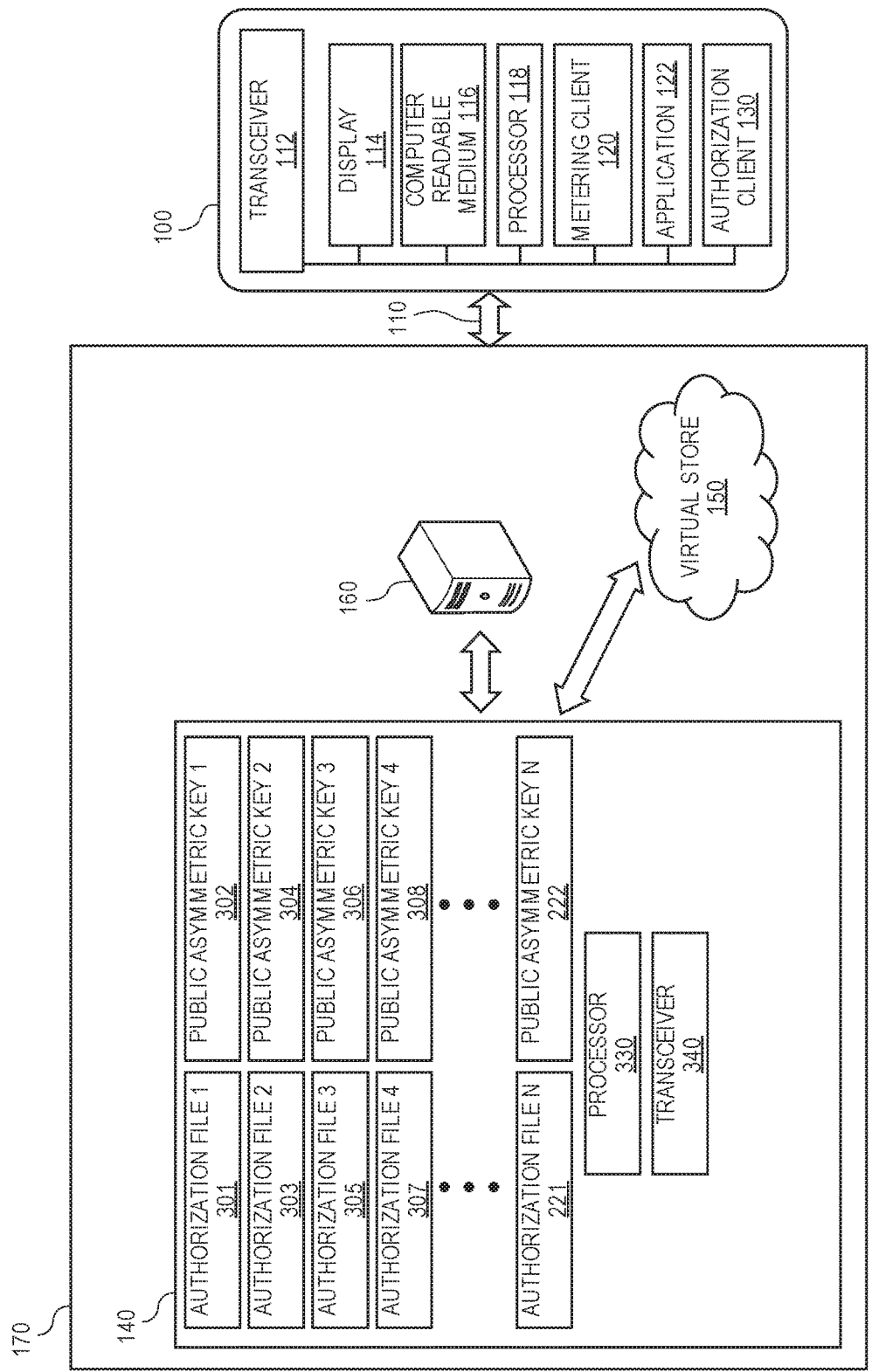
FIG. 3 illustrates the components of an exemplary authorization server used in a system for providing a mechanism and method for securely supporting one or more virtual game and application vendors on the wireless device, in accordance with aspects of the present disclosure.

FIGS. 2 and 3 illustrate the components of an exemplary authorization client 130 and an exemplary authorization server 140 which may be used in a system for providing a mechanism and method for securely supporting one or more virtual application vendors on the wireless device 100. The authorization client 130 may be provided by the wireless service provider and may be on the wireless device 100, part of the at least one larger server 170, or may be a separate server. The authorization client 130 may store the virtual locations 1 through n of any available applications 1-n (odd-numbered elements 401-421 of FIG. 4), the locations represented by odd-numbered elements 201-221 in FIG. 2. Each available application 401 may have a location 201 maintained and recorded in the authorization client 130.

In addition, each location 201 of the authorization client 130 may be associated with a public asymmetric key represented by even-numbered elements 202-222. For example, location 1 (201) would be associated with public asymmetric key 1 (202), location 2 (203) would be associated with public asymmetric key 2 (204), and so on. Asymmetric key pairs (even-numbered elements 402-422 of FIG. 4) may use asymmetric cryptography to encrypt and decrypt data.

Each asymmetric key pair 402 may have a pair of keys that includes a public asymmetric key 202 and a private asymmetric key 302. An asymmetric key may encrypt data on the authorization client 130 so that the data must be decrypted with the other asymmetric key in the asymmetric key pair 402 upon being received. A public asymmetric key 202 may be made available to anyone who requests it, but the private asymmetric key 302 in the asymmetric key pair 402 may be kept secure. A public asymmetric key 202 in the asymmetric key pair 402 may be distributed as a digital certificate or the like. In one aspect, a public asymmetric key 202 may be used to encrypt the location 201 of an application 401 on the authorization client 130. In such an aspect, the private asymmetric key 302 of the asymmetric key pair 402 may decrypt the public asymmetric key 202. In another aspect, a private asymmetric key 302 may encrypt the location 201 of an application 401 on the authorization, and a public asymmetric key 202 may accordingly decrypt the private asymmetric key 302. In one aspect of the disclosure, the authorization server 140 may be configured to authorize the location 201 of an application 401 based on the decryption of an asymmetric key associated with the available application 401.

In another aspect of the disclosure, the authorization client 130 may communicate with the processor 118. The processor 118 may be configured to encrypt and decrypt information associated with applications 401 on the authorization server 140 using asymmetric keys or the like. The processor 118 may also be configured to install applications 401 selected for download or purchase by the user of the wireless device 100. The processor 118 may be one processor or multiple processors.

In an aspect, the authorization client 130 may also communicate with the transceiver 112 to send and receive information related to applications 401 for use on the wireless device 100. The transceiver 112 on the authorization client 130 may also be configured to receive authorization files 301 from an authorization server 140. The processor 118 may receive authorization files 301 and applications 401 from the transceiver 112 to install on the wireless device 100. Using a communication channel 110, the processor 230 and transceiver 240 may transmit data for a selected application 401 to the wireless device 100 for installation on the wireless device 100.

In still another aspect of the disclosure, the authorization client 130 may include an interface 250 to be used on a virtual store 150 as described in more detail below. The processor 118 and transceiver 112 on the wireless device 100 may be configured to facilitate the presentation and execution of the interface 250 from the authorization client 130 to the virtual store 250. The interface 250 may allow the user of the wireless device 100 to see and select available applications 401 at the virtual store 150. The interface 250 may also facilitate the transfer of authorization files 301 as discussed further below.

The system may also include an authorization server 140, as depicted in FIG. 3. The authorization server 140 may be provided by the wireless service provider and may be a part of the at least one larger server 170 or may be a separate server. Given an application's location 201, the authorization server 140 may create an authorization file 301 using the second asymmetric key of the asymmetric key pair 402, which may be the private asymmetric key 302. Each authorization file 301 may be associated with a private asymmetric key 302. In FIG. 3, authorization files 1 through n are denoted by odd-numbered elements 301-321, and private asymmetric keys 1-n are denoted by even-numbered elements 302-322. For example, authorization file 1 (301) may be associated with private asymmetric key 1 (302), authorization file 2 (303) may be associated with private asymmetric key 2 (304), and so on.

The application 401 may not itself be encrypted, but the authorization file 301 that houses the location 201 of an application 401 may be encrypted with the public asymmetric key 202 from the authorization client 130. In such an aspect, the private asymmetric key 302 of the asymmetric key pair 402 may be used to decrypt the application's location 201 that may have been decrypted with the public asymmetric key 202 of the asymmetric key pair.

In another aspect of the disclosure, the authorization server 140 may provide one or more authorization files 301 to the virtual store 150 when requested. As explained in further detail below, when a user selects an application 401 for addition to the wireless device 100, the authorization server 140 may create a corresponding authorization file 301 and send that authorization file 301 to the virtual store 150.

The authorization server 140 may have a processor 330 and a transceiver 340. The processor 330 and transceiver 340 may be arranged so that the transceiver 340 can send and receive data over a communication channel as defined herein. In one aspect, the transceiver 340 may receive a request to create an authorization file 301. The processor 330 may then create the authorization file 301, and the transceiver 340 may transmit the authorization file 301 to the virtual store 150. The authorization file 301 may be stored on the authorization server 140 with a corresponding private asymmetric key 302.

Figure 4:
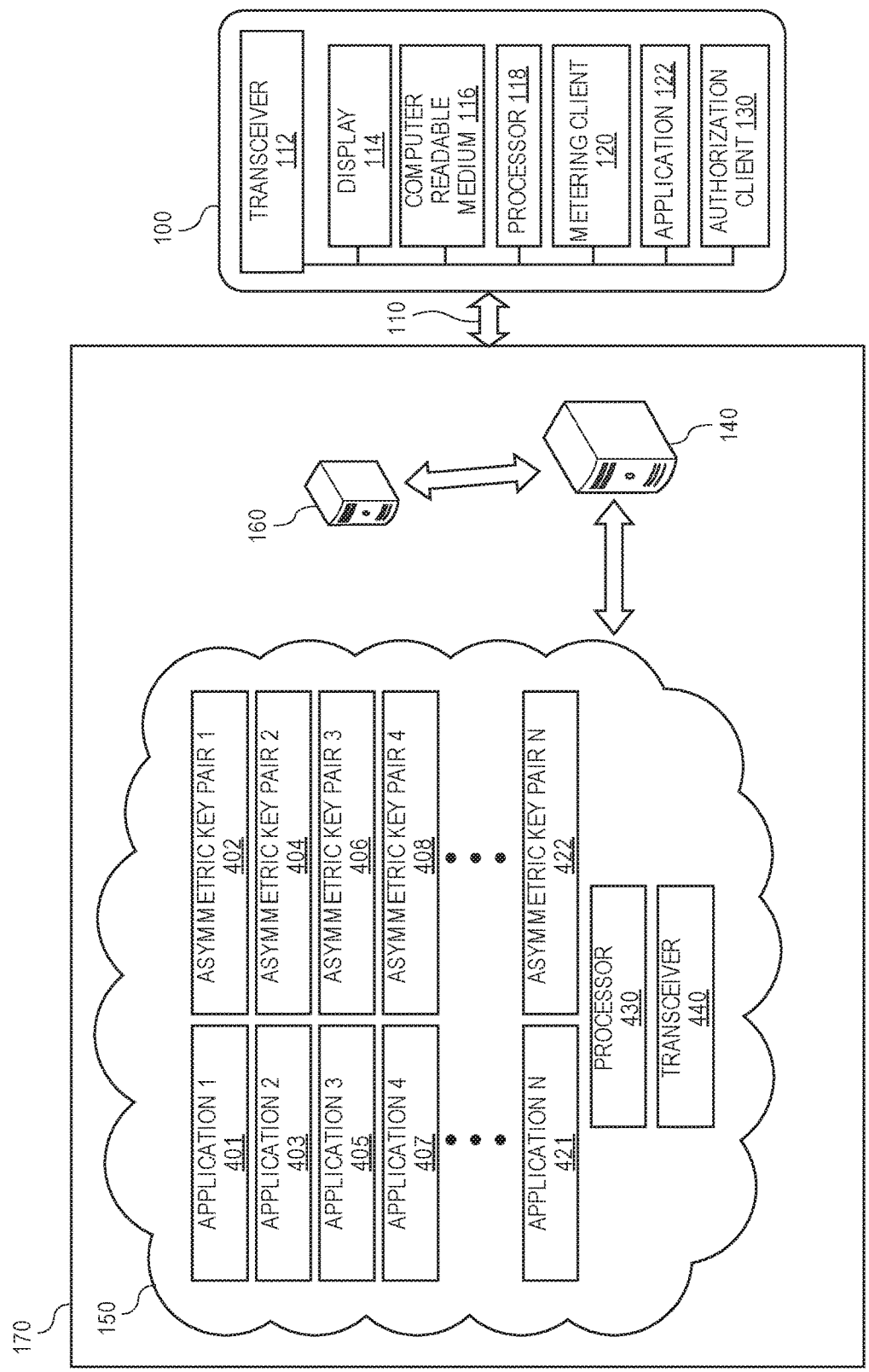
FIG. 4 illustrates the components of an exemplary virtual store used in a system for providing a mechanism and method for securely supporting one or more virtual game and application vendors on the wireless device, in accordance with aspects of the present disclosure.

FIG. 4 illustrates the components of an exemplary virtual store 150 used in a system for providing a mechanism and method for securely supporting one or more virtual game and application vendors on the wireless device 100. The virtual store 150 may be a part of the at least one larger server 170 or may be a separate server. The authorization client 130 may provide an interface 250 to the virtual store 150. This interface 250 may provide the location 201 of the authorization file 301 associated with the application 401.

The virtual store 150 may be configured to aggregate a list of applications 401 available to a user of the wireless device 100. The list of available applications 1 through n is denoted in FIG. 4 by odd-numbered elements 401-421. The list of applications 401 on the virtual store 150 may be communicated to the wireless device 100 via a communication channel 110 and displayed on the wireless device 100 display 114. The list of applications 401 may be in the form of a text-based list, a list of application 401 icons, images of the applications 401, or the like. The list of applications 401 may also include vendor information associated with the application 401, any purchase price, a file size, download time, or the like.

In another aspect, the virtual store 150 may present content to a wireless device 100 customer. Content presented to the customer may be communicated to the wireless device 100 via a communication channel 110 and may include not only the list of available applications 401, but content previews. Content can include images, video and audio clips, trial usage, and the like. Content presented to the user of the wireless device 100 may be designed to promote applications 401 to add to the wireless device 100.

In order for an application 401 to be available on the virtual store 150 for the wireless device 100, the vendor of the application 401 may register the application 401 with the wireless provider. Upon registration of an application 401 and vendor, an asymmetric key pair 402 may be created for the virtual store 150 by the authorization server 140. Each application 401 available on the virtual store 150 may be associated with an asymmetric key pair 402. Asymmetric key pairs 1 through n in the virtual store 150 of FIG. 4 are denoted by the even-numbered elements 402-422. For example, application 1 (401) may be associated with asymmetric key pair 1 (402), application 2 (403) may be associated with asymmetric key pair 2 (404), and so on.

In an aspect, the virtual store 150 may include a processor 430 and a transceiver 440. The processor 430 and transceiver 440 may be configured to present, via a communication channel 110 and the interface 250, on the wireless device 100 display 114 the list of applications 401 available for the wireless device 100 and content associated with those applications 401. The transceiver 440 may be configured to receive a user selection of an application 401 on the virtual store 150 to add to the wireless device 100. In response to receiving a user selection of an application 401 on the virtual store 150, the processor 430 may use the transceiver 440 to communicate the application 401 selection to the authorization server 140 to create an authorization file 301 for the application 401. That process will be explained in more detail below.

In another aspect of the disclosure, the virtual store 150 processor 430 may be configured to create the asymmetric key pair 402 upon registration of the application 401 on the virtual store 150. Upon the creation of the asymmetric key pair 402 on the virtual store 150, the processor 430 may instruct the transceiver 440 to provide the asymmetric key pair 402 to an update server 160.

Figure 5:
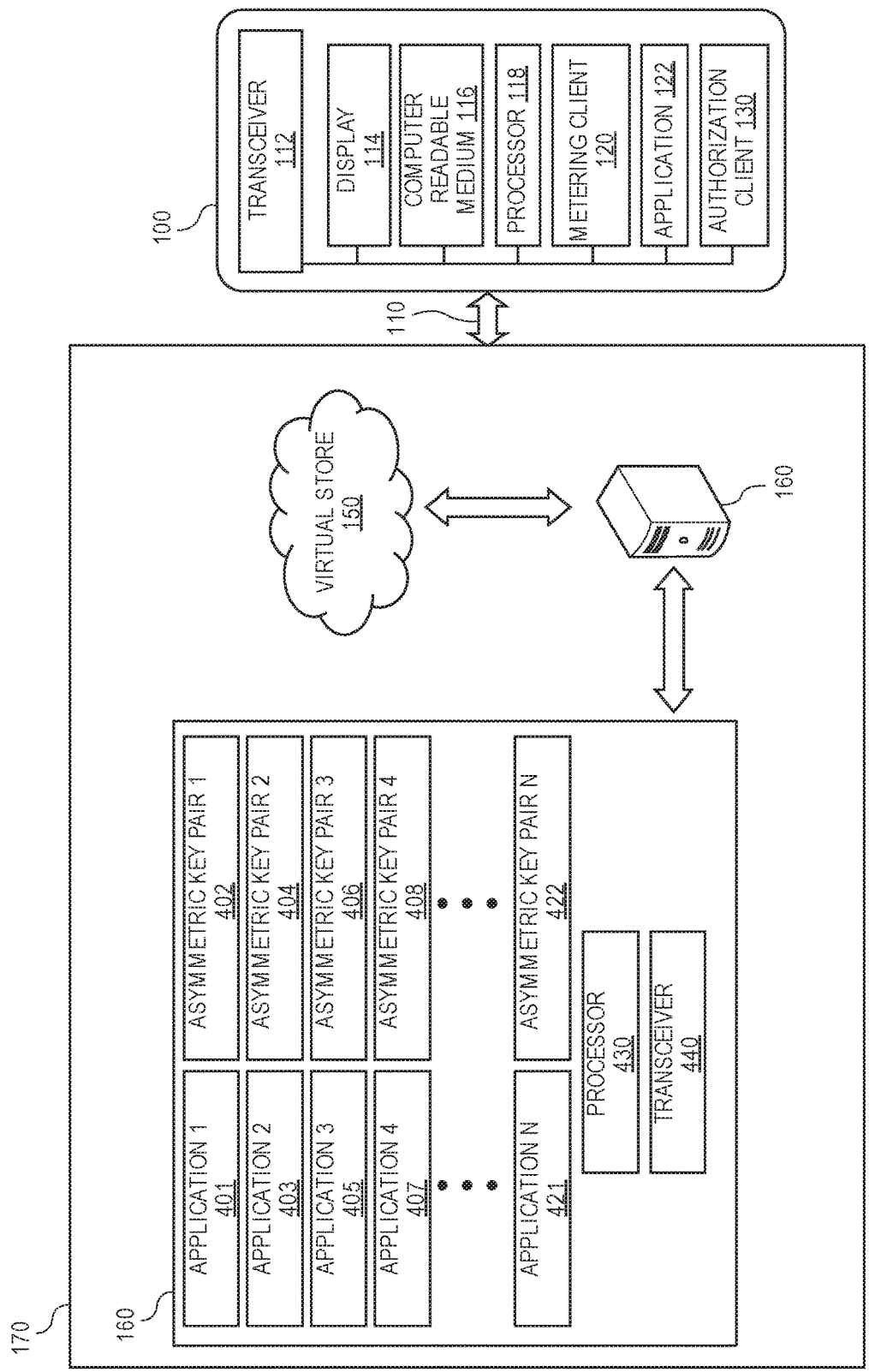
FIG. 5 illustrates the components of an exemplary update server used in a system for providing a mechanism and method for securely supporting one or more virtual game and application vendors on the wireless device, in accordance with aspects of the present disclosure.

FIG. 5 illustrates the components of an exemplary update server 160 used in a system for providing a mechanism and method for securely supporting one or more virtual game and application vendors on the wireless device. The update server 160 may be part of the at least one larger server 170 or may be a separate server. When the virtual store 150 registers application 401 and creates a corresponding asymmetric key pair 402, the virtual store transceiver 440 may transmit the application 401 and corresponding asymmetric key pair 402 to the update server 160. In one aspect, the update server 160 may include a processor 530 and a transceiver 540. The transceiver 540 may be configured to receive from the virtual store 150 the application 401 and its asymmetric key pair 402.

In another aspect, the update server 160 may be configured with its processor 530 and transceiver 540 to provide the sets of asymmetric keys 402 that correspond to application 401 to the authorization client 130 and to the authorization server 140.

Figure 6:
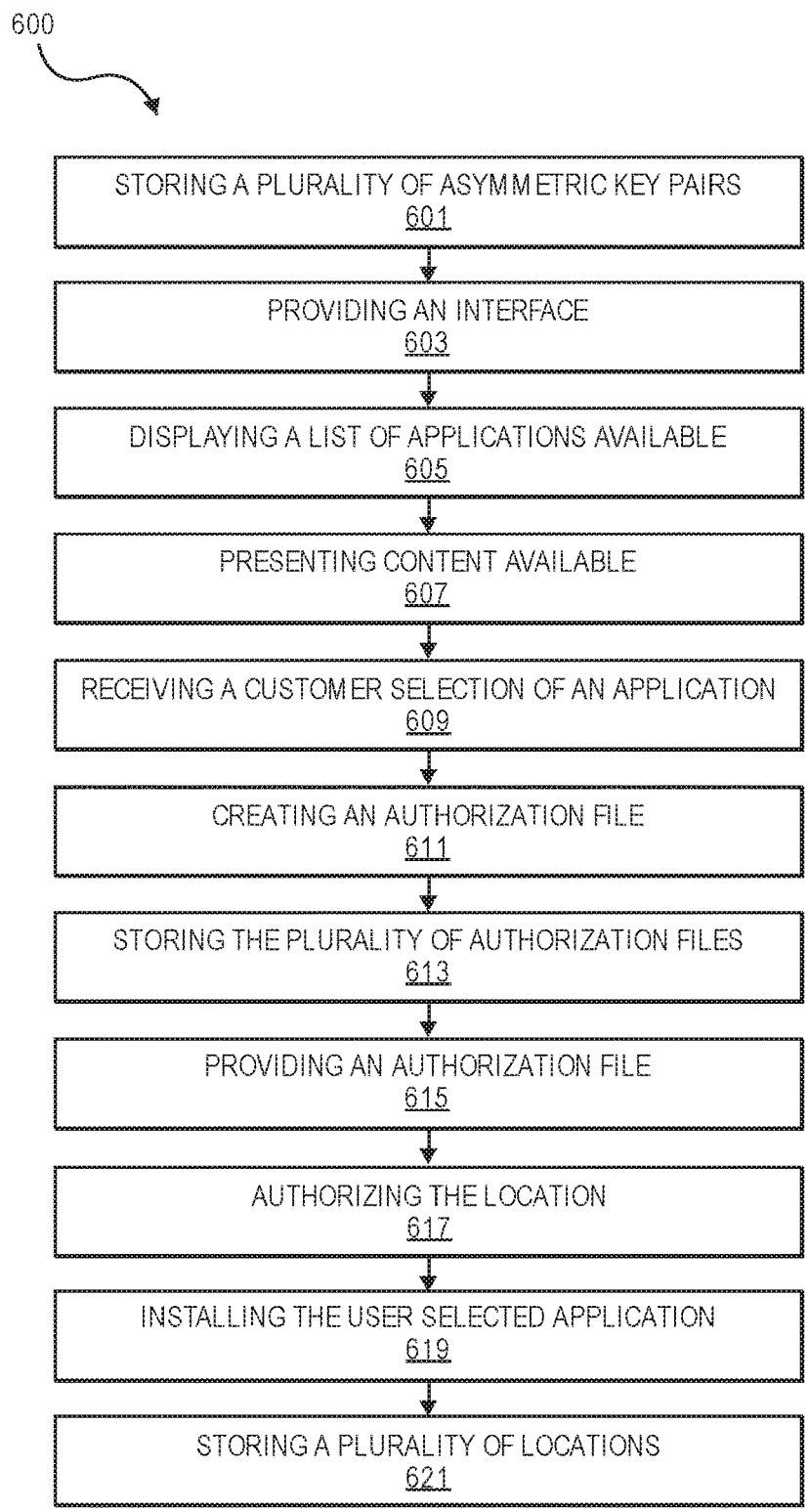
FIG. 6 shows the steps in a method for securely supporting at least one application for use on a wireless device, in accordance with aspects of the present disclosure.

FIG. 6 shows the steps in the method 600 for securely supporting at least one application 401 for use on a wireless device, in accordance with aspects of the present disclosure. The authorization client 130 and authorization server 140 may store 601 the asymmetric key pair. The authorization client 130 may store 603 the public asymmetric key 202 of the asymmetric key pair, and the authorization server 140 may store 603 the private asymmetric key 302.

In another aspect, the authorization client 130 may provide 603 an interface 250 to the virtual store 150 in order to provide the location 201 of the authorization file 301 of the application 401. The authorization file 301 may be encrypted with a public asymmetric key 202 from the authorization client 130. The authorization file 301 may store on the authorization server 140 the location 201 of the application 401.

As the authorization client 130 provides 603 the interface 250, the virtual store 150 may display 605 on the wireless device 100 display 114, via a communication channel 110 and the interface 250, a list of applications 401 available for the wireless device 100. Each application 401 available to the wireless device may be associated with a location 201 protected by a public asymmetric key 202. The displaying 605 of available applications 401 for the wireless device 100 may be in the form of a text-based list, application icons, images, or the like. In addition to displaying 605 the list of applications 401 available for the wireless device 100, the virtual store 150 may present 607 available content for the wireless device 100. The available content presented 607 by the virtual store 150 may be presented 607 on the wireless device 100 display 114 and may include descriptions of the available applications 401, previews, images, videos, or the like.

In an aspect, when a user selects an application 401 from the virtual store 150, the virtual store may receive 609 the user selection with its transceiver 540. Upon the virtual store 150 transceiver 540 receiving the user selection of an application 401 for the wireless device 100, the virtual store 150 may communicate with the authorization server 140 to create 611 a corresponding authorization file 301. The authorization server 140 may then store 613 the authorization file 301 among a plurality of authorization files 301.

Once an authorization file 301 has been created 611, the authorization server 140 may provide 615 the authorization file 301 to the virtual store 150 and to the authorization client 130. Once the authorization client 130 has received the authorization file 301, the authorization client 130 may authorize 617 the location 201 of the application 401 based on decrypting by using the asymmetric key pair. In an aspect, one asymmetric key in the pair can decrypt the other key in the pair used for encryption of data related to the application. In one example, a private asymmetric key 302 may decrypt the public asymmetric key 202 of the asymmetric key pair. Such decryption of the asymmetric key pairs 202 and 302 may authorize 617 the location 201 of the application 401 for use.

Once the authorization client 130 has authorized 617 the location 201 of the application 401, the authorization client 130 may install 619 the application 401 on the wireless device 100 with the user's consent. In an aspect, installing 619 the application 401 on the wireless device 100 may include verifying that the vendor of the application 401 is recognized. If an application 122 on the wireless device 100 is one from the vendor associated with the application 401 selected from the virtual store 150, then the authorization client 130 may install 619 the application 401 on the wireless device. If the application 401 is associated with a vendor that is not associated with any applications 122 that were pre-installed on the wireless device 100, then an unknown source exception may be generated on the wireless device 100. Installation 619 can be executed immediately, upon user demand, or upon a set later time. The authorization client 130 may also store 621 the location 201 associated with the application 401.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The disclosure may include communication channels 110 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels 110.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system for securely supporting a plurality of applications for use on a wireless device, the system comprising:
 at least one server having at least one processor, the at least one server configured to connect with the wireless device over a network, and the at least one server configured to:
  receive a plurality of locations, each of the plurality of locations corresponding to a location of one of the plurality of applications;
  store a plurality of public asymmetric keys, each of the plurality of public asymmetric keys corresponding to one of the plurality of locations;
  receive an authorization file corresponding to one of the plurality of applications;
  store a plurality of authorization files, each one of the plurality of authorization files comprising one of the plurality of locations of one of the plurality of applications;
  authorize one of the plurality of locations of one of the plurality of applications;
  create, with a private asymmetric key corresponding to one of the plurality of public asymmetric keys, the one of the plurality of authorization files comprising an application location;
  encrypt the plurality of authorization files, each one of the plurality of authorization files comprising one of the plurality of public asymmetric keys;
  store a list of the plurality of applications for use on the wireless device;
  provide a menu of available content corresponding to the plurality of applications for use on the wireless device; and
  receive a user selection of one of the applications for use on the wireless device for installing one of the plurality of applications on the wireless device.

2. The system of claim 1, further comprising an authorization client comprising:
 the plurality of locations; and
 the plurality of public asymmetric keys.

3. The system of claim 1, wherein the at least one processor is further configured to determine whether a user has selected a third-party application.

4. The system of claim 3, wherein the at least one processor is further configured to determine, based on the determination that the user has selected a third-party application, whether the wireless device does not have an existing second application of the third-party.

5. The system of claim 4, wherein the at least one processor is further configured to provide, based on the determination that the wireless device does not have an existing second application of the third-party, an unknown source exception message to the wireless device.

6. The system of claim 2, further comprising a transceiver configured to receive an update of one of the plurality of public asymmetric keys from an update server, and wherein the at least one processor is configured to update one of the plurality of public asymmetric keys based on the transceiver receiving the update of one of the plurality of public asymmetric keys from the update server.

7. The system of claim 6, wherein the authorization client is configured to:
 receive the plurality of locations;
 store the plurality of locations;
 store the plurality of public asymmetric keys;
 receive the authorization file corresponding to one of the plurality of applications;
 authorize the location of one of the plurality of applications;
 provide an interface to a virtual store; and
 install one of the plurality of applications on the wireless device.

8. The system of claim 1, further comprising an authorization server comprising:
 the plurality of authorization files;
 a plurality of private asymmetric keys, each one of the private asymmetric keys paired with one of the plurality of public asymmetric keys and configured to decrypt utilizing the paired one of the plurality of public asymmetric key and one of the plurality of private asymmetric keys;
 a transceiver configured to send and receive information related the applications for use on the wireless device, to receive the location of an application; and
 at least one processor configured to create one of the plurality of authorization files comprising the location of the application, to encrypt one of the plurality of authorization files with one of the plurality of public asymmetric keys, and to provide one of the plurality of authorization files to an authorization client for installation on the wireless device.

9. The system of claim 8, wherein the authorization server is further configured to:
 store the plurality of authorization files;
 create one of the plurality of authorization files comprising the application location;
 encrypt the plurality of authorization files; and
 provide one of the plurality of authorization files.

10. The system of claim 8, wherein each of the plurality of public asymmetric keys is stored on and provided by the authorization client.

11. The system of claim 8, wherein:
the transceiver is further configured to receive an update to one of the plurality of public asymmetric keys and to one of the plurality of private asymmetric keys from an update server; and
the at least one processor is further configured to update one of the plurality of public asymmetric keys and one of the plurality of private asymmetric keys based on the transceiver receiving the update.

12. The system of claim 1, further comprising a virtual store comprising:
the list of the plurality of applications for use on the wireless device;
a plurality of asymmetric key pairs, each asymmetric key pair corresponding to an application from the list of the plurality of applications for use on the wireless device;
the menu of available content;
a transceiver configured to send and receive information related to the plurality of applications for use on the wireless device and to receive a user selection of one of the plurality of applications for use for the wireless device; and
at least one processor configured to initiate, in response to the transceiver receiving a user selection of one of the plurality of applications, an authorization a creation of the authorization file.

13. The system of claim 12, wherein the virtual store is configured to:
display the menu of available content;
receive the user selection of one of the plurality of applications for use on the wireless device; and
initiate an authorization server for a creation of an application file.

14. The system of claim 12, wherein the menu of available content further comprises a list of content vendors, each of the applications corresponding to a content vendor.

15. The system of claim 12, wherein the transceiver is further configured to receive a user selection of the application for download at a later time.

16. The system of claim 12, wherein the transceiver is further configured to receive, from an authorization server, an authorization file corresponding to one of the applications selected for use on the wireless device.

17. The system of claim 12, wherein the transceiver is further configured to transmit to an authorization client vendor information associated with one of the applications selected.

18. A method of securely supporting applications for use on a wireless device, the method comprising:
storing a plurality of locations, each of the plurality of locations corresponding to a location of one of the applications for use on the wireless device;
storing a plurality of public asymmetric keys for encryption of the plurality of locations in at least one server, each of the plurality of public asymmetric keys corresponding to one of the plurality of locations;
providing an interface for a virtual store with the at least one server;
providing, along with the interface, a location of a plurality of authorization files, the plurality of authorization files comprising one of the plurality of locations of one of the applications for use on the wireless device;
providing, on the virtual store with the at least one server, a list of the applications available for the wireless device;
providing, on the virtual store with the at least one server, content associated with the list of the applications available for the wireless device;
receiving over network from a wireless device, at the virtual store with the at least one server, a customer selection of one of the applications;
creating, with the at least one server, in response to receiving a customer selection of one of the applications, an authorization file comprising the location of one of the applications;
storing, on the at least one server, the plurality of authorization files;
providing an authorization file;
authorizing one of the plurality of locations based on decryption of at least one of the plurality of public asymmetric keys; and
allowing installation on the wireless device a user selected one of the applications,
wherein the steps of authorizing, creating, and installing are performed by the at least one server.

19. The method of claim 18, wherein creating an authorization file further comprises encrypting the authorization file with one of the plurality of public asymmetric keys corresponding to the location of the application.

20. The method of claim 18, further comprising:
registering a new application available for the wireless device;
creating, in response to registering the new application, a public asymmetric key and a private asymmetric key; and
updating, in response to creating the public asymmetric key and the private asymmetric key, the at least one server with the public asymmetric key and the private asymmetric key.

* * * * *